Patented June 27, 1933

1,915,734

UNITED STATES PATENT OFFICE

MARTIN HANKEL AND KARL JELLINEK, OF OFFENBACH-ON-THE-MAIN, GERMANY, ASSIGNORS TO GENERAL ANILINE WORKS, INC., OF NEW YORK, N. Y., A CORPORATION OF DELAWARE

PREPARATION USEFUL FOR THE PRODUCTION OF DYESTUFFS AND PROCESS OF MAKING SAME

No Drawing. Application filed January 30, 1930, Serial No. 424,730, and in Germany February 7, 1929.

Our present invention relates to new compositions of matter, useful in the production of azo dyestuffs on the fiber, more particularly it relates to preparations containing a nitrosamine alkali metal salt of the benzene series, an arylamide of 2-hydroxy-naphthalene-3-carboxylic acid and an alkali metal salt capable of binding water.

The new preparations may be produced by mixing the nitrosamine alkali metal salt with the 2.3-hydroxynaphthoic acid arylamide, free from sulfonic or carboxylic acid groups, and adding to the mixture an alkali metal salt capable of binding water.

Preparations similar to ours but containing in addition to the above named ingredients an acid substance are disclosed in application Serial No. 345,602, filed March 8, 1929, in the name of Martin Hankel. Our new preparations are free from acid substances; it may in some cases even be of advantage to add a small amount of an alkali, which addition may, according to the components used, favorably influence the stability of the preparations.

The 2.3-hydroxynaphthoic acid arylamides may be used either in the form of their dry alkali metal salts or in the form of the free hydroxy compounds. The preparations are obtained in the form of dry powders by simply mixing the several ingredients in the desired ratio of concentration and triturating the mixtures. Although the nitrosamines are more or less explosive our new preparations may be handled and marketed without danger due to the stabilizing action of the neutral salts admixed to the components.

In order to further illustrate our invention the following examples are given, the parts being by weight and all temperatures in centigrade degrees; but it is to be understood that our invention is not limited to the particular products or reacting conditions mentioned therein:—

Example 1

600 parts of a paste containing the nitrosamine sodium salt prepared from 288 parts of 2.5-dichloroaniline and containing about 2.56% of free caustic soda are ground with 567 parts of anhydrous sodium acetate and 500 parts of 2-hydroxy-3-naphthoyl-o-phenetidine.

In this manner a dry yellowish powder is obtained.

Example 2

633 parts of a paste containing the nitrosamine potassium salt prepared from 304 parts of 2.5-dichloroaniline and containing about 2.56% of free caustic soda are ground with 532 parts of anhydrous sodium acetate and 500 parts of 2-hydroxy-3-naphthoyl-o-anisidine.

In this manner a light yellowish powder is obtained.

Example 3

830 parts of a paste of nitrosamine corresponding to 300 parts of 4-chloro-2-aminoanisole and containing about 7.4% of free caustic potash are ground with 60 parts of pulverulent caustic soda, 27.7 parts of anhydrous sodium acetate and 500 parts of 2-hydroxy-3-naphthoyl-o-anisidine.

In this manner a yellowish powder is obtained.

Example 4

130 parts of a paste containing the nitrosamine potassium salt prepared from 363 parts of dianisidine and containing about 10.3% of free caustic potash are ground with 87.2 parts of anhydrous sodium acetate and 115.9 parts of the sodium salt of 2-hydroxy-3-naphthoyl-aniline.

In this manner a dry yellow powder is obtained.

The sodium salt of 2-hydroxy-3-naphthoyl-aniline used above is prepared as follows:

203 parts of 2-hydroxy-3-naphthoyl-aniline are made into a paste by means of a small amount of warm water. To this cold or slightly warm paste a concentrated caustic soda solution containing 52 parts of caustic soda is added while stirring. Thereby a thin pulp is formed which is dried at moderate temperature with or without application of a vacuum. The product contains 86–87% of 2-hydroxy-3-naphthoyl-aniline in the form of its sodium salt.

*Example 5*

628 parts of a paste of nitrosamine corresponding to 302 parts of 2.5-dichloro-aniline and containing about 2.56% of free caustic soda are ground with 469 parts of anhydrous sodium acetate and 570 parts of the sodium salt of 2-hydroxy-3-naphthoyl-aniline.

In this manner a dry yellow powder is obtained.

*Example 6*

810 parts of a paste containing the nitrosamine sodium salt prepared from 812 parts of 3-nitro-4-amino-toluene and containing about 2.56% of free caustic soda are ground with 287 parts of anhydrous sodium acetate and 570 parts of the sodium salt of 2-hydroxy-3-naphthoyl-aniline.

In this manner a dry yellow powder is obtained.

Other azo-components having a substantive character and containing no sulfonic or carboxylic groups may be used instead of the 2.3 hydroxy-naphthoic acid arylamides mentioned above.

We claim:—

1. As new compositions of matter dry preparations containing a nitrosamine alkali metal salt of the benzene series, an arylamide of 2-hydroxy-3-naphthoic acid and an alkali metal salt capable of binding water.

2. As new compositions of matter dry preparations containing a nitrosamine alkali metal salt of the benzene series, a phenylamide of 2-hydroxy-3-naphthoic acid and an alkali metal salt capable of binding water.

3. As new compositions of matter dry preparations containing a nitrosamine alkali metal salt produced from a chlorinated aniline, a phenylamide of 2-hydroxy-3-naphthoic acid and sodium acetate.

4. As a new composition of matter the dry preparation containing a nitrosamine alkali metal salt of 2.5-dichloroaniline, the anilide of 2-hydroxy-3-naphthoic acid and sodium acetate.

5. As a new composition of matter the dry preparation containing a nitrosamine alkali metal salt of 2.5-dichloroaniline, the ortho-anisidide of 2-hydroxy-3-naphthoic acid and sodium acetate.

6. As a new composition of matter the dry preparation containing a nitrosamine alkali metal salt of 2.5-dichloroaniline, the ortho-phenetidide of 2-hydroxy-3-naphthoic acid and sodium acetate.

In testimony whereof, we affix our signatures.

MARTIN HANKEL.
KARL JELLINEK.